United States Patent

[11] 3,607,830

| [72] | Inventors | James E. Kearnan |
| | | Yorktown Heights; |
| | | Edward D. Weil, Yonkers, both of N.Y. |
| [21] | Appl. No. | 772,007 |
| [22] | Filed | Oct. 30, 1968 |
| [45] | Patented | Sept. 21, 1971 |
| [73] | Assignee | Stauffer Chemical Company |
| | | New York, N.Y. |

[54] CARRIER MEDIUM FOR LIQUID N,N 'POLYTHI-BIS-DIALKYLAMINE
3 Claims, No Drawings

[52] U.S. Cl. .................................................. 260/41.5,
260/79.5, 260/762, 260/785, 260/793, 260/798
[51] Int. Cl. ........................................................ C08f 27/06
[50] Field of Search ........................................... 260/79.5,
795, 41 A, 41 B, 41.5 A, 762

[56] References Cited
UNITED STATES PATENTS

| 1,873,935 | 8/1932 | Lommel | 260/79.5 |
| 2,490,518 | 12/1949 | Hand | 260/79.5 |
| 2,747,005 | 5/1956 | Zerbe | 260/763 |
| 2,974,117 | 3/1961 | Dunkel | 260/41.5 |
| 3,036,980 | 5/1962 | Dunham | 260/31.4 |
| 3,362,937 | 1/1968 | Kent | 260/79.5 |

FOREIGN PATENTS

| 604,583 | 9/1960 | Canada | 260/79.5 |

*Primary Examiner*—Joseph L. Sohofer
*Assistant Examiner*—C. A. Henderson, Jr.
*Attorneys*—Robert C. Sullivan, Donald M. MacKay, Daniel C. Block and Paul J. Juettner

ABSTRACT: A curing agent for rubber compounds consisting essentially of a liquid N,N'-polythio-bis-dialkylamine curing agent absorbed into finely divided solid carrier which is inert to the reaction of the rubber compound which is in the form of a free flowing nonsticky powder which has nondusting, semipelletized characteristics and releases the liquid curing agent in the rubber compound at cure temperatures without loss of any effectiveness.

_3,607,830_

CARRIER MEDIUM FOR LIQUID N,N'POLYTHI-BIS-DIALKYLAMINE

BACKGROUND OF THE INVENTION

Copolymers derived from α-olefins such as the polyα-olefin copolymer ethylene/propylene rubber, have recently entered the market on a large commercial scale. Because of low monomer cost, this material promises to be the rubber industry's lowest priced elastomer, and because of the essentially free double bond content, this material is outstanding in its resistance to degradation by oxygen and ozone. For this same reason, however, this rubber material is rather difficult to vulcanize. Moreover, a noxious odor is given off when the rubber material is finally cured which is objectionable.

In order to overcome this vulcanization problem, a synthetic rubber composition has been developed that is sulfur curable and based on ethylene and propylene. This product contains, besides ethylene and propylene, a third monomer unit derived from a nonconjugated diene. The resulting terpolymer, after polymerization, contains a controlled degree of unsaturation which, as in the case of butyl rubber, serve as curing sites for vulcanization with standard sulfur containing compounds. Although the odor problem is less critical by the use of this terpolymer, the curing rate is still sluggish.

To reduce the cure time for the ethylene propylene diene terpolymer, curing agents or cross-linking agents have been proposed to vulcanize the rubber-polymer at a reduced cure cycle. Thus, commercial manufacturers of the ethylene propylene diene terpolymer recommend recipes based on solid curing agents such as tetramethyl thiuram disulfide, 2-mercaptobenzothiazole, tellurium diethyl dithiocarbamate and dipentamethylenethiuram tetrasulfide. However, the recipes formulated by the manufacturers have not been notably successful in reducing the curing time of the terpolymer.

More recently, N,N'-polythio-bis-dialkylamine has been proposed for use as a curing agent in combination with other curing agents for the terpolymers. This material is manufactured by first intermixing a suitable dialkylamine with an immiscible organic solvent in a suitable reaction vessel. Then, a suitable sulfur dichloride is simultaneously added with an aqueous inorganic base to maintain the reaction medium in a basic condition. The organic layer and aqueous layers are separated and then free elemental sulfur is added to the organic layer and allowed to react therewith to provide the resultant product in yields above percent which exhibits excellent curing properties for the above-described terpolymers. The end product, however, is a liquid composition and commercial formulators prefer a solid curing agent for use in existing compounding apparatus.

BRIEF DESCRIPTION OF THE INVENTION

It has been discovered that liquid N,N'-polythio-bis-dialkylamine liquid curing agent can be absorbed into finely divided solid carrier to form a free flowing nonsticky powder formulation which has nondusting, semipelletized characteristics and releases the liquid material in the rubber compound at cure temperatures without loss of effectiveness.

DETAILED DESCRIPTION OF THE INVENTION

In the practice of the present invention, the liquid polythio-bis-dialkylamine is first formulated by selecting a suitable dialkylamine to provide the requisite properties to the end product. Thus, the dialkylamine may be selected from the group consisting of dimethylamine, diethylamine, dipropylamine, dibutylamine, and mixtures thereof. The alkyl group can be selected from alkyl radicals having from one to about eight carbon atoms. The dialkyl amine is then intermixed with an organic solvent which is immiscible with water. The solvent selected should be relatively inert to the products added thereto and are preferably selected from the aliphatic and aromatic hydrocarbon series. Thus, the immiscible organic solvent can be selected from the group consisting of hexane, petroleum ethers, benzene, ether, chlorinated hydrocarbon, toluene, xylene, or mixtures thereof.

After the dialkylamine and immiscible organic solvent have been thoroughly intermixed together, a suitable aqueous inorganic base and sulfur chloride are simultaneously added thereto. The inorganic base and sulfur chlorides can be each added in a separate funnel or conduit or can be intermixed therewith. The aqueous inorganic base can be selected from the group consisting of sodium hydroxide, sodium carbonate, potassium hydroxide, potassium carbonate, and mixtures thereof. The sulfur chlorides can be selected from the group consisting of sulfur monochloride, sulfur dichloride, polymeric sulfur chlorides and mixtures thereof. The amount of sulfur chloride and aqueous inorganic base employed is that necessary to react with all the dialkylamines or the stoichiometric amount. Preferably, however, about a 10 percent excess of each component is employed.

The sulfur chlorides and inorganic base are reacted with a dialkylamine at a temperature ranging between room temperature up to about 60° C., preferably around room temperature. The pH of the reaction medium is maintained above 7, preferably between 9 and 8.0. After the components have been reacted together, the aqueous layer is separated from the organic layer.

Free elemental sulfur is added to the organic layer in at least stoichiometric and excess quantities to provide an end product of bis-dialkylamine sulfide having a sulfur rank of at least 5, but preferably having an average sulfur rank of about 6.0 to about 8.0. The reaction temperature is maintained between about 50° and 150° C. The product is then separated from the solvent system. It has been found in practice that the use of this two phase system to synthesize the N,N'-polythio-bis-dialkylamine provides a yield of at least 90percent and usually up to about 98 to 99 percent.

Thereafter, the liquid N,N'-polythio-bis-dialkylamine is absorbed on a finely divided solid material selected from the group consisting of hydrated sodium silica aluminate, calcium silicate, barium sulfate, calcium sulfate, silica, talc, magnesium silicate, sulfur, tripolite, calcite, diatomaceous earth, chalk, kaolin clay, bentonite clay, dolomite, pyrophyllite, Mc-Namee clay, titanium dioxide and carbon black if the color of the end product is immaterial. It is preferred to use calcium silicate or hydrated sodium silica aluminate as the carrier. The liquid is added slowly with the constantly stirred solid carrier. The amount of liquid curing agent absorbed on the solid carrier should be at least 5 percent of the total weight of the end product, preferably 25 percent or more.

The addition of the liquid curing agent can be brought about in a tumbler mixer, V-blender, ribbon blender, Waring blender, dough mixer, or the like.

The resultant solid product disperses well in the ethylene/propylene diene terpolymers and may be characterized as a nondusting solid that releases the liquid material in the rubber compounds at cure temperatures without the loss of any effectiveness upon the rubber compositions.

In order to illustrate the merits of the present invention, the following examples are provided:

EXAMPLE 1

Finely divided calcium silicate in an amount of 50 grams was added to a waring blender and stirred at high speed. Then, 85 grams of N,N'-polythio-bis-dimethylamine was added dropwise. The resulting product was smooth and dry (nonpacking). The content of the effective material is 63 percent by weight.

EXAMPLE 2

The material of example 1 was used as a curing agent in a standard formulation for a rubber compound and compared to the rubber compound without the curing agent and with the liquid curing agent but without the solid carrier. The amount of each component is expressed in parts by weight. The rubber recipe was as follows:

|  | A | B | C |
|---|---|---|---|
| EPDM Polymer | 100 | 100 | 100 |
| Carbon Black | 150 | 150 | 150 |
| Naphthenic Process Oil | 70 | 70 | 70 |
| Stearic Acid | 1 | 1 | 1 |
| Zinc Oxide | 5 | 5 | 5 |
| 2-Mercaptobenzothiazole | 0.5 | 0.5 | 0.5 |
| Tetramethyl thiuram disulfide | 1.5 | 1.5 | 1.5 |
| Rubbermakers sulfur | 1.5 | 1.0 | 1.0 |
| N,N'-polythio-bis-dimethylamine |  | 1.0 |  |
| N,N'-polythio-bis-dimethylamine/ calcium silicate 63/37 |  |  | 1.45 |

The rubber composition as noted above was then tested in accordance with standard procedure with the following result:

TABLE 1

|  | A | B | C |
|---|---|---|---|
| Rotating Disc Viscometer at 270° F., Small rotor |  |  |  |
| Time to 5 point rise, minutes | 10' | 8' | 8' |
| Oscillating Disc Rehograph at 320° F. 900 c.p.m. |  |  |  |
| Maximum Viscosity, in.-lbs. | 105 | 114 | 116 |
| Time to 90% max. visc., minutes | 8 | 6 | 6 |

EXAMPLE 3

When 90 grams of N,N'-polythio-bis-dimethylamine was added to 10 grams of finely divided calcium silicate, the resultant product was pasty and unsatisfactory for use in rubber compound.

EXAMPLE 4

When 5 grams of N,N'-polythio-bis-dimethylamine was added to 95 grams of finely divided calcium silicate and 20 grams of material was milled with a standard rubber compound, the result was a reduction in the properties of the rubber compound. Elongation and modulus was significantly reduced and the hardness increased.

EXAMPLE 5

The procedure of example 1 was repeated in its entirety except that varying amounts of different solid carriers were employed. Each of the solid curing agents was incorporated into a standard rubber formulation in the same manner as example 2. The recipe employed is as follows:

|  | A | B | C | D | E |
|---|---|---|---|---|---|
| EPDM polymer | 100 | 100 | 100 | 100 | 100 |
| Carbon black | 150 | 150 | 150 | 150 | 150 |
| Naphthenic process oil | 70 | 70 | 70 | 70 | 70 |
| Stearic acid | 1 | 1 | 1 | 1 | 1 |
| Zinc Oxide | 5 | 5 | 5 | 5 | 5 |
| 2-mercaptobenzothiazole | 0.5 | 0.5 | 0.5 | 0.5 | 0.5 |
| Tetramethyl thiuram disulfide | 1.5 | 1.5 | 1.5 | 1.5 | 1.5 |
| Rubbermakers sulfur | 1.5 | 1.0 | 1.0 | 1.0 | 1.0 |
| N,N'-polythio-bis-dimethylamine/calcium silicate 70/30 |  | 1.45 |  |  |  |
| N,N'-polythio-bis-dimethylamine/hydrated sodium silica aluminate 60/40 |  |  | 1.7 |  |  |
| N,N'-polythio-bis-dimethylamine/Kaolin clay 45/55 |  |  |  | 2.2 |  |
| N,N'-polythio-bis-dimethylamine/McNamee clay 25/75 |  |  |  |  | 4.0 |

Each of the recipes above formulated were tested in accordance with standard procedure with the following results:

TABLE II

|  | A | B | C | D | E |
|---|---|---|---|---|---|
| Rotating disc viscometer at 270° F., small rotor: |  |  |  |  |  |
| Time to 5 point rise in viscosity, mins | 10 | 8 | 8 | 8 | 8 |
| Oscillating disc rheograph at 320° F., 900 c.p.m.: |  |  |  |  |  |
| Maximum viscosity, in.-lbs | 105 | 114 | 116 | 114 | 115 |
| Time to 90% maximum viscosity, mins | 8 | 6 | 6 | 6 | 6 |

What is claimed is:

1. A composition of matter comprising ethylene, propylene, diene terpolymer, and a curing agent consisting essentially of (1) a liquid N,N'-polythio-bis-dialkylamine having a sulfur rank of at least 5 where said dialkylamine contains from 1 to about 8 carbon atoms and (2) a solid finely divided carrier; said liquid N,N'-polythio-bis-dialkylamine being absorbed into the said solid carrier.

2. A composition of matter as set forth in claim 1 wherein said solid carrier is selected from a group consisting of hydrated sodium silica aluminate, calcium, silicate, barium sulfate, calcium sulfate, silica, talc, magnesium silicate, sulfur, tripolite, calcite, diatomaceous earth, chalk, kaolin clay, bentonite clay, dolomite, pyrophyllite, titanium dioxide and McNamee clay.

3. The composition of matter as set forth in claim 1 wherein said inert finely divided solid carrier is present in an amount of at least 5 percent of the total weight of the end product.

PO-1050
(5/69)

UNITED STATES PATENT OFFICE
CERTIFICATE OF CORRECTION

Patent No. 3,607,830    Dated Sept. 21, 1971

Inventor(s) James E. Kearnan and Edward D. Weil

It is certified that error appears in the above-identified patent and that said Letters Patent are hereby corrected as shown below:

Column 1, line 47, after the word "above" insert --90--.

Column 2, line 23, the number "8.0" should read --12--.

Column 3, line 25, fourth line in Table I, the word "Rehograph" should read --Rheograph--.

Column 4, line 27, second line in Table II, the symbol "," was omitted after each value for the number of minutes for the "Time to 5 point rise in viscosity, mins."

Signed and sealed this 9th day of May 1972.

(SEAL)
Attest:

EDWARD M. FLETCHER, JR.          ROBERT GOTTSCHALK
Attesting Officer                Commissioner of Patents